United States Patent
Williams et al.

[11] Patent Number: 6,020,080
[45] Date of Patent: Feb. 1, 2000

[54] METHOD FOR FABRICATING THICK FILM CAPACITIVE DEVICES AND THE RESULTING DEVICES

[75] Inventors: Jerry E. Williams, Anaheim; Jerry G. Hilbert, Santa Ana, both of Calif.

[73] Assignee: Wyvern Technologies, Santa Ana, Calif.

[21] Appl. No.: 08/901,105

[22] Filed: Jul. 28, 1997

[51] Int. Cl.[7] .................................................. B32B 17/00
[52] U.S. Cl. ........................................... 428/701; 428/702
[58] Field of Search ................................ 361/320, 321.1, 361/321.2, 321.3, 321.4, 321.5; 501/17, 20; 428/701, 702

[56] References Cited

U.S. PATENT DOCUMENTS 5,561,587  10/1996  Sanada .................................. 361/306.1

Primary Examiner—Timothy M. Speer
Attorney, Agent, or Firm—Leonard Tachner

[57] ABSTRACT

A fabrication process for producing thick film electrical components wherein capacitive and RC components may be provided with extremely low impedance by minimizing inadvertent inductance. The process relies on the use of thick film technology to deposit a plurality of distinct overlying flat layers of appropriate size, shape and materials on an underlying substrate. Use of relatively large area conductive films to form plates of a capacitor, results in a highly precise capacitance with virtually no inductive component. The process employs a series of print, dry and fire steps for each layer of screening on a substrate. The magnitude of the fabricated capacitance is based on the number of capacitor plates screened as well as the area of the plates, the thickness of the dielectric plate between the capacitor plates and the dielectric constant of the dielectric plate. In an RC component configuration, such as for a termination device, a plurality of thick film resistors is screened and laser trimmed to precisely match them to one another. Then an overcoat is provided to protect the various layers.

7 Claims, 5 Drawing Sheets

Capacitance with 5 screenings -----

Capacitance = (.225*10000*1*.411091*.000001)/.001 = .924955uF

Capacitance with 5 screenings -----

Capacitance = (.225*10000*1*.411091*.000001)/.001 = .924955uF

Capacitance with 7 screenings -----

Capacitance = (.225*10000*2*.411091*.000001)/.001 = 1.8499uF

METHOD FOR FABRICATING THICK FILM CAPACITIVE DEVICES AND THE RESULTING DEVICES

BACKGROUND OF THE INVENTION

1. Field of the Invention

The present invention relates generally to the field of resistor/capacitor (RC) networks and more particularly to a thick film fabrication technique for providing capacitive and RC components having extremely low impedances.

2. Prior Art

Virtually any prior art capacitor has some amount of inductance which increases overall impedance. Such inadvertent inductive component results from even the slightest extent of non-planar capacitor plate configuration. However, there are occasions when even the slightest added impedance is detrimental to circuit operation. Therefore, there is a need for a capacitive component that has virtually no inductive component.

SUMMARY OF THE INVENTION

The present invention relates to a fabrication process for producing thick film electrical components wherein capacitive and RC components may be provided with extremely low impedance by minimizing inadvertent inductance. The process relies on the use of thick film technology to deposit a plurality of distinct overlying flat layers of appropriate size, shape and materials on an underlying substrate. Use of relatively large area conductive films to form plates of a capacitor, results in a highly precise capacitance with virtually no inductive component. In a number of preferred embodiments disclosed herein, the inventive process is used to fabricate an RC termination device having a plurality of precisely matched resistors and an extremely low impedance capacitor.

The process employs a series of print, dry and fire steps for each layer of screening on a substrate. The magnitude of the fabricated capacitance is based on the number of capacitor plates screened as well as the area of the plates, the thickness of the dielectric plate between the capacitor plates and the dielectric constant of the dielectric plate. In an RC component configuration, such as for a termination device, a plurality of thick film resistors is screened and laser trimmed to precisely match them to one another. Then an overcoat is provided to protect the various layers. Several different configurations with different amounts of capacitance are disclosed herein. Each such embodiment varies from the others in the number of capacitive plates screened onto the substrate. The method of the invention is essentially the same for each embodiment varying only in the number of steps.

OBJECTS OF THE INVENTION

It is therefore a principal object of the present invention to provide a thick film capacitive device having virtually no inadvertent inductance.

It is another object of the invention to provide a screen printed electrical component having a very precise capacitance with little measurable inductance.

It is an additional object of the invention to provide a method for fabricating an RC termination having essentially no resistor series inductance.

It is still an additional object of the invention to provide a method for fabricating a large area thick film capacitor with virtually no inadvertent inductive component.

It is still an additional object of the invention to provide a process for screen printing an RC network with highly precise component values of resistance and capacitance.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which.

DETAILED DESCRIPTION OF PREFERRED EMBODIMENTS

Figure 1:
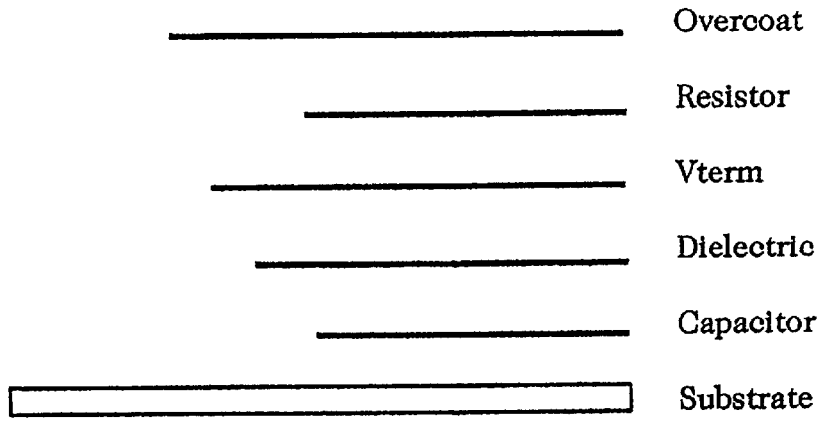
FIG. 1 is a conceptual diagram of a first embodiment of an RC termination fabricated in accordance with the invention.
Figure 2:
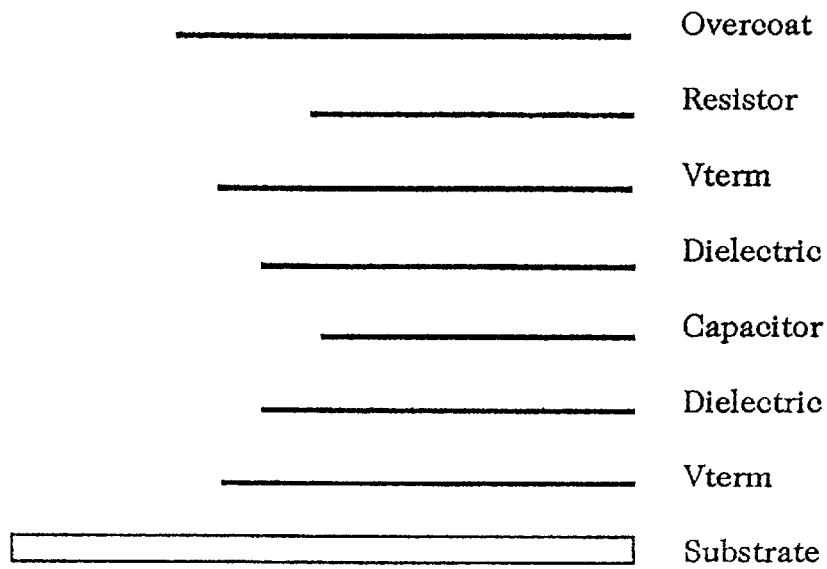
FIG. 2 is a conceptual diagram of a second embodiment of an RC termination.
Figure 3:
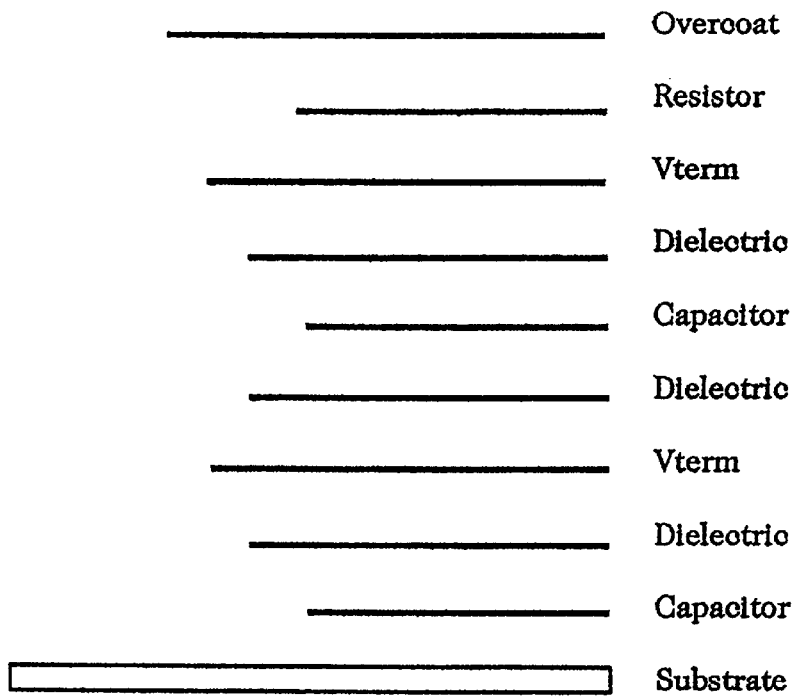
FIG. 3 is a conceptual diagram of a third embodiment of an RC termination.
Figure 5:
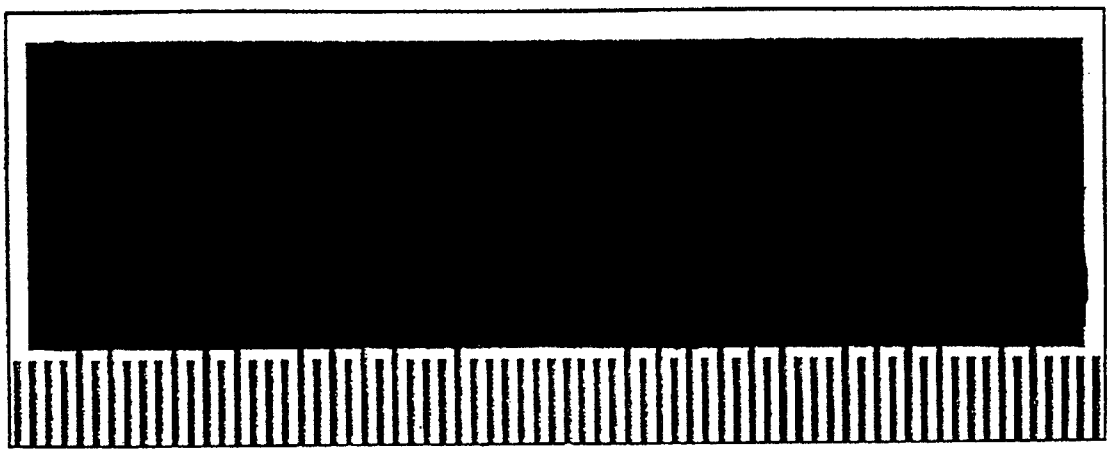
FIG. 5 is an enlarged plan view of a capacitor plate fabricated in accordance with the invention.

Referring to the accompanying figures, and to FIGS. 1–3 initially, it will be seen that in a first embodiment (FIG. 1) a substrate has printed on to it a capacitor plate, dielectric layer, V term layer, resistor layer and overcoat, in that order. The capacitance of the capacitor plate is determined from the following equation:

$$C = (0.225 \times K \times (N-1) A \times 0.000001)/T \qquad (1)$$

where
K=Dielectric Constant
N=Number of Plates
A=Area of plates in square inches
T=Dielectric Thickness In the illustrated embodiment, the area A is selected as 0.411091 square inches, K=10,000, T=0.001 inches. The embodiment of FIG. 1 uses N=1 while in the embodiments of FIG. 2 and FIG. 3, the number of plates is 2 and 3, respectively. Based upon equation (1), the capacitance of the 5 screening configuration of FIG. 1 is 0.924955 $\mu$F.

In FIG. 2 the substrate receives in order a first Vterm layer, a first dielectric layer, a capacitor plate, a second dielectric layer, a second Vterm layer, a resistor layer and overcoat. The capacitance of the FIG. 2 configuration of 7 screenings is 1.8499 $\mu$F.

In FIG. 3 the substrate receives in order a first capacitor plate, a first dielectric layer, a first Vterm layer, a second dielectric layer, a second capacitor plate, a third dielectric layer, a second Vterm layer, a resistor layer and overcoat. The capacitance of the FIG. 3 configuration of 9 screenings is 2.774864 $\mu$F. It will be understood that the capacitance may be increased in 0.924955 $\mu$F increments with additional screenings. It will also be understood that any or all of the parameters of equation (1) may be altered to change the capacitance.

In all of the illustrated embodiments, the substrate is a 0.025 inches thick layer of alumina and is 1.38 inches×0.453 inches in width and height. The Vterm conductor screen and the capacitor plate each are fabricated from a 325 mesh screen using a 25 micron emulsion and a 1.1 mil wire diameter. The dielectric screen is fabricated using a 200 mesh screen, a 40 micron emulsion and a 1.6 mil wire diameter. The resistor screen is fabricated from a 200 mesh screen, a 10 micron emulsion and a 1.6 mil wire diameter. The overcoat or overglaze is made from a screen that is 325 mesh and has a 1.1 mil wire diameter and using a 30 micron emulsion. Each of the screens employs a stainless steel mesh in an 8"×10" on cast aluminum frame.

The conductor material used for the Vterm layer and for the capacitor plate is a platinum silver in a thixotropic screen printable paste available from Electro-Science Laboratories, Inc. of King of Prussia, Pa. as ESL No. D-9516. The dielectric layer material is a screen printable, high capacitance density material providing a dielectric constant of about 10,000. The aforementioned company provides the dielectric material under ESL No. 4210. The resistive layer material is a ruthenium-based resistor composition sold as a paste under ESL No. 3911. The overglaze paste is sold under ESL No. D-4039-G. The respective thick film layers of an exemplary termination module, fabricated in accordance with the process of the present invention are shown in FIGS. 5 through 9.

Figure 4:
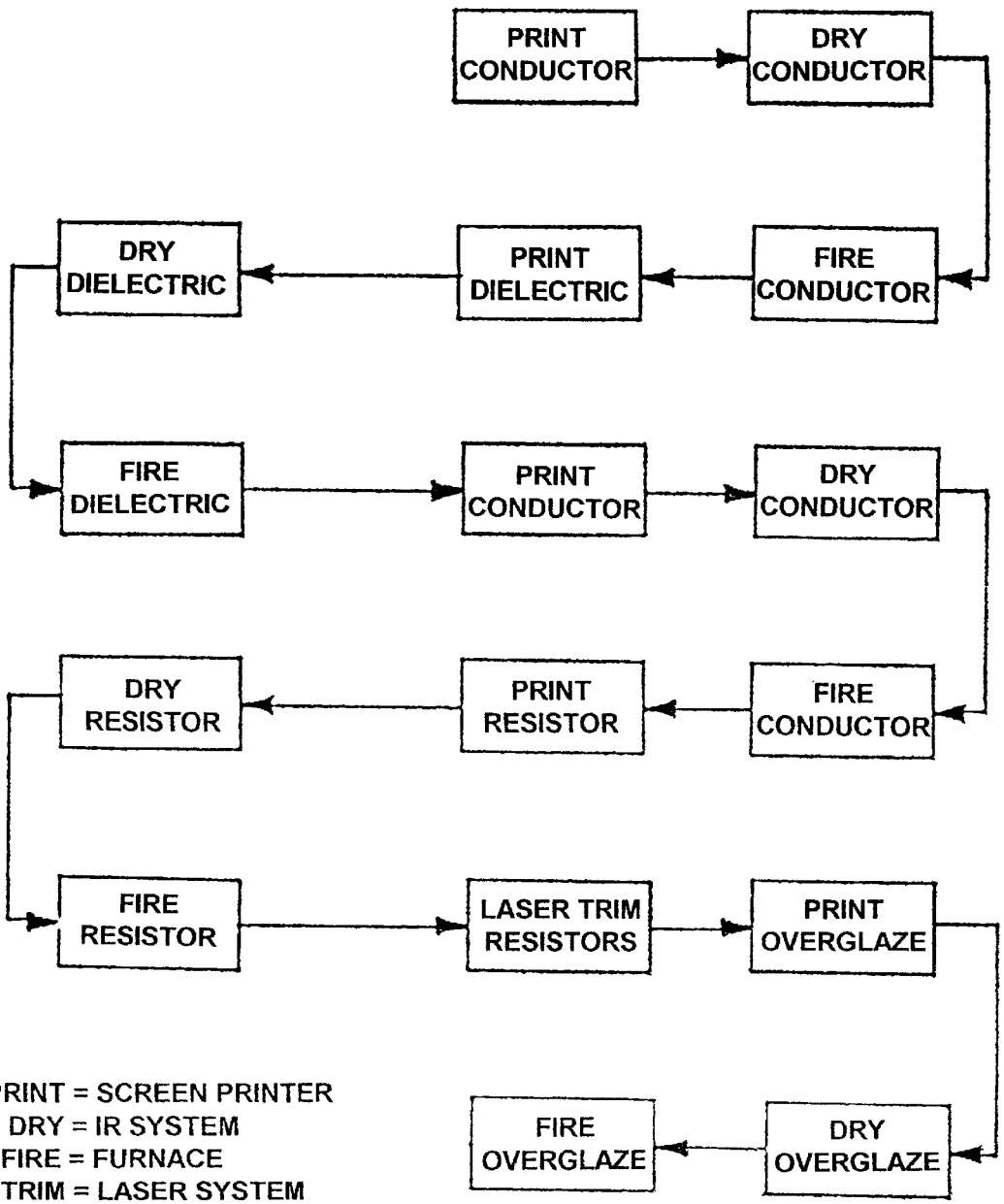
FIG. 4 is a block diagram of an illustrative embodiment of the process of the present invention.
Figure 6:
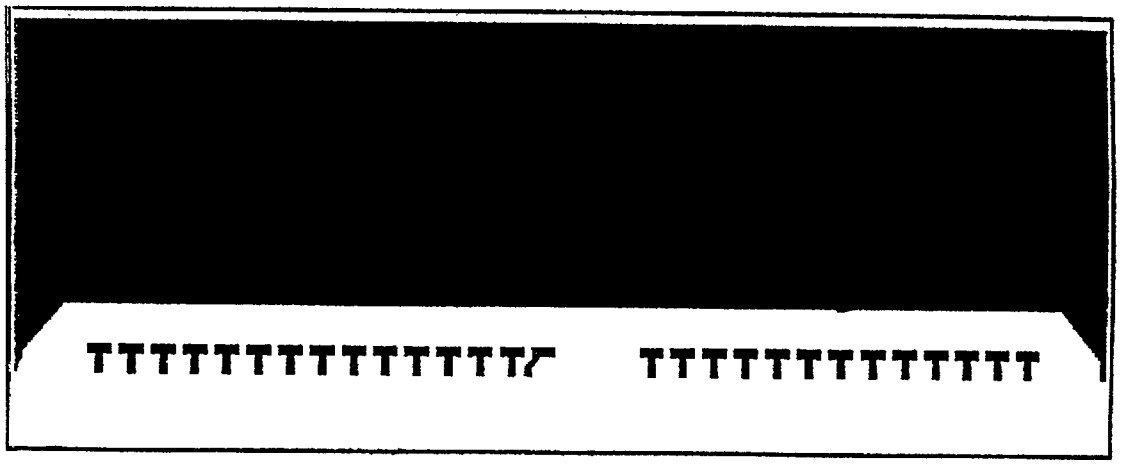
FIG. 6 is an enlarged plan view of a Vterm layer.
Figure 7:
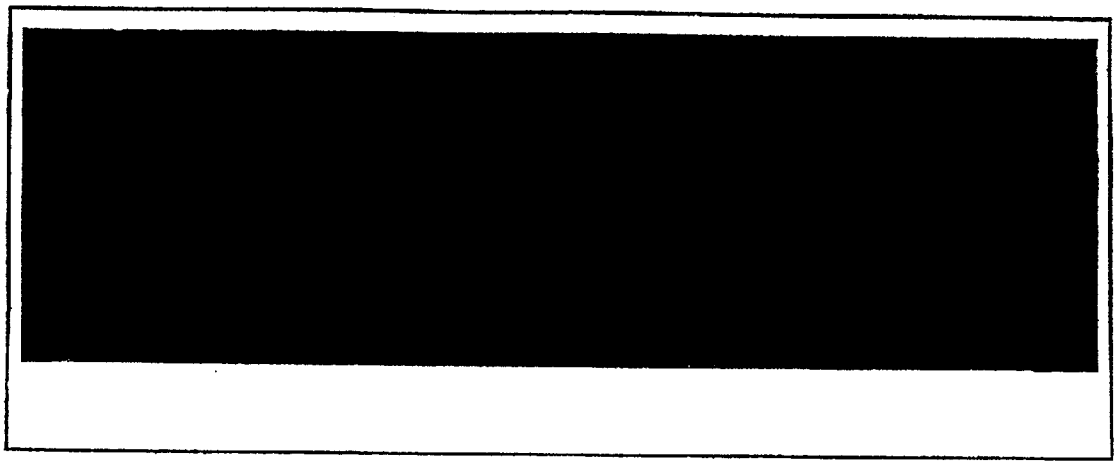
FIG. 7 is an enlarged plan view of a dielectric plate.
Figure 8:
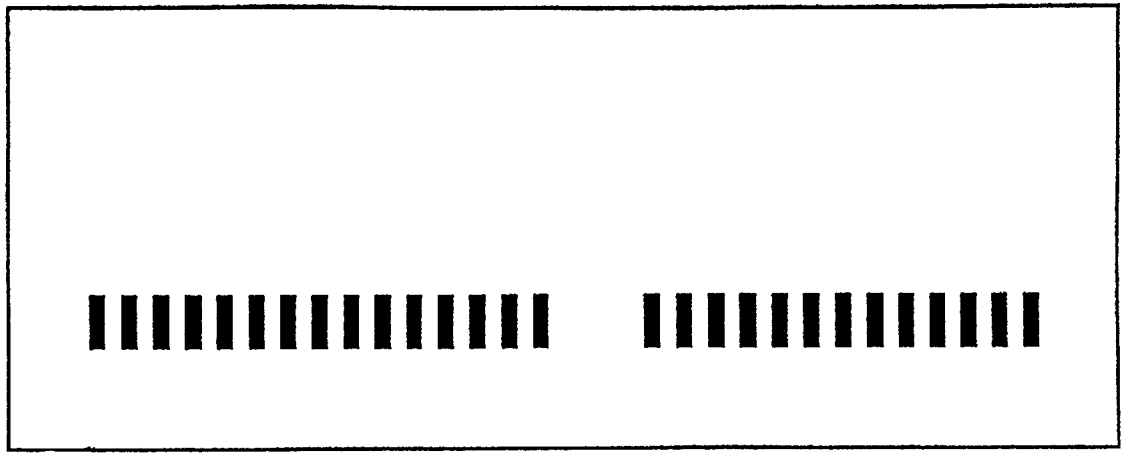
FIG. 8 is an enlarged plan view of a resistor layer.
Figure 9:
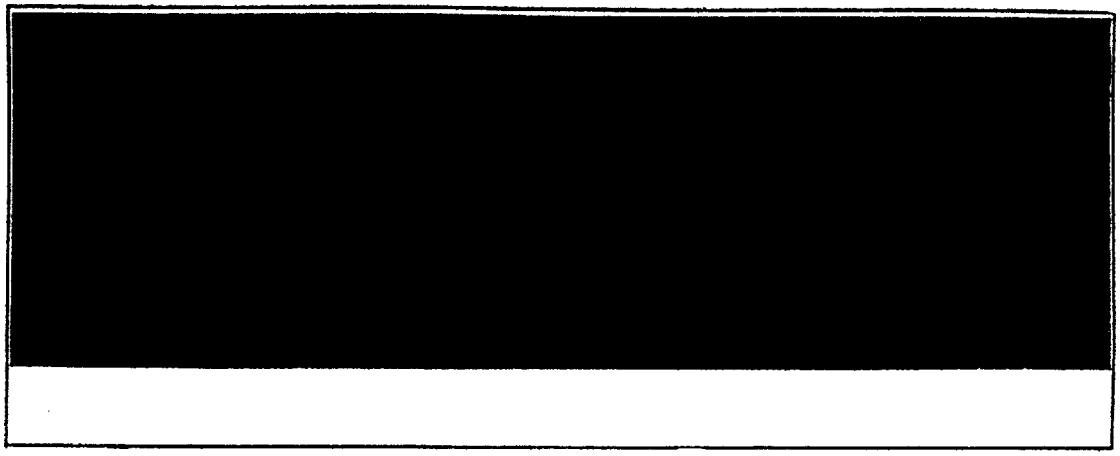
FIG. 9 is an enlarged plan view of an overcoat layer.

The process of the invention is illustrated in FIG. 4 which shows the process steps for the 5 screen version of FIG. 1. As shown therein, each screen layer is subjected to three identical steps comprising printing, drying and firing.

Printing is accomplished in a screen printer using the screen parameters previously described for each layer. A suitable thick film screen printer is a Presco model 465 printer manufactured by AMI of North Branch, N.J. Drying is accomplished in a convection infrared system comprising five zones set to 125 to 130 degrees Celsius. A suitable IR drying system is a Model 310 manufactured by Vitronics Corporation of Newmarket, N.H. Hampshire and controlled by Vitronics version 2.1 control software. Firing is accomplished using a BTU Engineering Corp. Transheat model TFF91-5-90A24 Fast Firing Thick Film Furnace manufactured by BTU Engineering of North Billerica Mass. As further seen in FIG. 4, the resistors in the resistor layer are trimmed after firing. Resistor laser trimming is accomplished using a Teradyne W411/High Volume Passive Trim System having a helium, neon Yag 50 Watt laser and manufactured by Teradyne, Inc. Of Boston, Mass.

Of course, it will be understood that the steps of the process for the embodiments of FIGS. 2 and 3 are similar to those depicted in FIG. 4 with additional iterations of printing, drying and firing steps as required for the appropriate screening layer.

Having thus described the best presently contemplated mode of several embodiments of the invention, it being understood that the disclosure is of an illustrative nature and that it is not limiting of the invention which is more broadly defined in the appended claims, what we claim is:

1. A capacitive device comprising:
   a flat dielectric substrate; and
   a plurality of thick film layers progressively overlayed on said substrate by screen printing, drying and firing each such respective layer.

2. The capacitive device recited in claim 1 wherein said substrate is a ceramic material.

3. The capacitive device recited in claim 2 wherein said ceramic material is alumina.

4. The capacitive device recited in claim 1 wherein said plurality of thick film layers comprises at least two conductive material layers separated by a dielectric layer.

5. The capacitive device recited in claim 1 wherein said plurality of thick film layers comprises at least three conductive layers, each being separated by each of the other two conductive layers by a respective dielectric layer.

6. The capacitive device recited in claim 1 wherein at least one layer of said plurality of thick film layers comprises a plurality of laser trimmed resistors.

7. The capacitive device recited in claim 1 wherein an uppermost layer of said plurality of thick film layers comprises an overcoat layer.

* * * * *